US009353691B2

(12) United States Patent
Simmons et al.

(10) Patent No.: US 9,353,691 B2
(45) Date of Patent: May 31, 2016

(54) FUEL ROUTING SYSTEM OF A GAS TURBINE ENGINE AND METHOD OF ROUTING FUEL

(71) Applicant: General Electric Company, Schenectady, NY (US)

(72) Inventors: James Arthur Simmons, Tampa, FL (US); William Randolph Shinkle, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 639 days.

(21) Appl. No.: 13/718,499

(22) Filed: Dec. 18, 2012

(65) Prior Publication Data

US 2014/0165580 A1 Jun. 19, 2014

(51) Int. Cl.
*F02C 7/22* (2006.01)
*F02C 9/28* (2006.01)
*F02C 9/26* (2006.01)
*F02C 9/34* (2006.01)
*F02C 7/228* (2006.01)

(52) U.S. Cl.
CPC . *F02C 9/263* (2013.01); *F02C 7/22* (2013.01); *F02C 7/222* (2013.01); *F02C 9/28* (2013.01); *F02C 7/228* (2013.01); *F02C 9/34* (2013.01); *F05D 2220/76* (2013.01)

(58) Field of Classification Search
CPC ............. F02C 7/22–7/232; F02C 9/26–9/34; F23R 3/34–3/346
See application file for complete search history.

(56) References Cited

U.S. PATENT DOCUMENTS

| | | | | |
|---|---|---|---|---|
| 2,846,845 A | * | 8/1958 | Parker | F02C 7/232 137/115.16 |
| 3,658,249 A | * | 4/1972 | Sharpe | F02C 7/224 239/125 |
| 3,805,519 A | * | 4/1974 | Plotnick | F02C 9/32 60/223 |
| 4,344,280 A | * | 8/1982 | Minakawa | F23R 3/28 60/39.092 |
| 4,402,184 A | * | 9/1983 | Faulkner | F02C 7/222 60/739 |
| 4,719,750 A | * | 1/1988 | Lemmin | F02C 9/26 60/226.1 |
| 5,301,500 A | | 4/1994 | Hines | |
| 5,896,736 A | | 4/1999 | Rajamani | |

(Continued)

*Primary Examiner* — Phutthiwat Wongwian
*Assistant Examiner* — Rene Ford
(74) *Attorney, Agent, or Firm* — Dority & Manning, PA

(57) ABSTRACT

A fuel routing system of a gas turbine engine includes a primary fuel circuit in communication with a fuel source and a fuel distribution manifold. Also included is a secondary fuel circuit extending from the primary fuel circuit to a plurality of fuel nozzles configured to direct fuel to a plurality of combustor chambers. Further included is a main fuel flow control valve disposed in the primary fuel circuit for restricting a fuel flow to the fuel distribution manifold upon removal of an electrical load operably coupled to the gas turbine engine. Yet further included is a plurality of check valves disposed between the secondary fuel circuit and the primary fuel circuit for restricting the fuel flow between the secondary fuel circuit and the primary fuel circuit.

17 Claims, 3 Drawing Sheets

(56) References Cited

U.S. PATENT DOCUMENTS

| | | | | |
|---|---|---|---|---|
| 6,655,152 B2 * | 12/2003 | Griffiths | ............... | F02C 7/236 60/39.281 |
| 6,892,544 B2 * | 5/2005 | Futa, Jr. | ............... | F02C 7/232 60/39.094 |
| 7,457,688 B2 | 11/2008 | Szepek et al. | | |
| 7,624,564 B2 * | 12/2009 | Stuttaford | ............... | F02C 7/22 60/39.281 |
| 2003/0014962 A1 * | 1/2003 | Tanaka | ............... | F01D 21/06 60/39.091 |
| 2003/0014979 A1 * | 1/2003 | Summerfield | ............ | F23R 3/34 60/776 |
| 2007/0186557 A1 * | 8/2007 | Gallagher | ............... | F02C 9/28 60/773 |
| 2008/0071427 A1 | 3/2008 | Szepek et al. | | |
| 2009/0126802 A1 * | 5/2009 | Rawlinson | ............. | F02C 7/228 137/98 |
| 2009/0223226 A1 * | 9/2009 | Koizumi | ................ | F02C 3/22 60/736 |
| 2010/0173253 A1 * | 7/2010 | Mohr | .................. | F02C 7/228 431/12 |
| 2011/0167829 A1 * | 7/2011 | Scully | .................. | F02C 7/222 60/740 |
| 2011/0271679 A1 * | 11/2011 | Mestroni | ................ | F02C 7/22 60/734 |
| 2012/0159953 A1 * | 6/2012 | Griffiths | ................ | F02C 7/228 60/734 |
| 2013/0125556 A1 * | 5/2013 | Hoke | .................. | F02C 7/228 60/773 |
| 2014/0123651 A1 * | 5/2014 | Smith | .................. | F23N 1/002 60/737 |
| 2014/0196466 A1 * | 7/2014 | Codron | ................ | F02C 7/228 60/776 |

\* cited by examiner

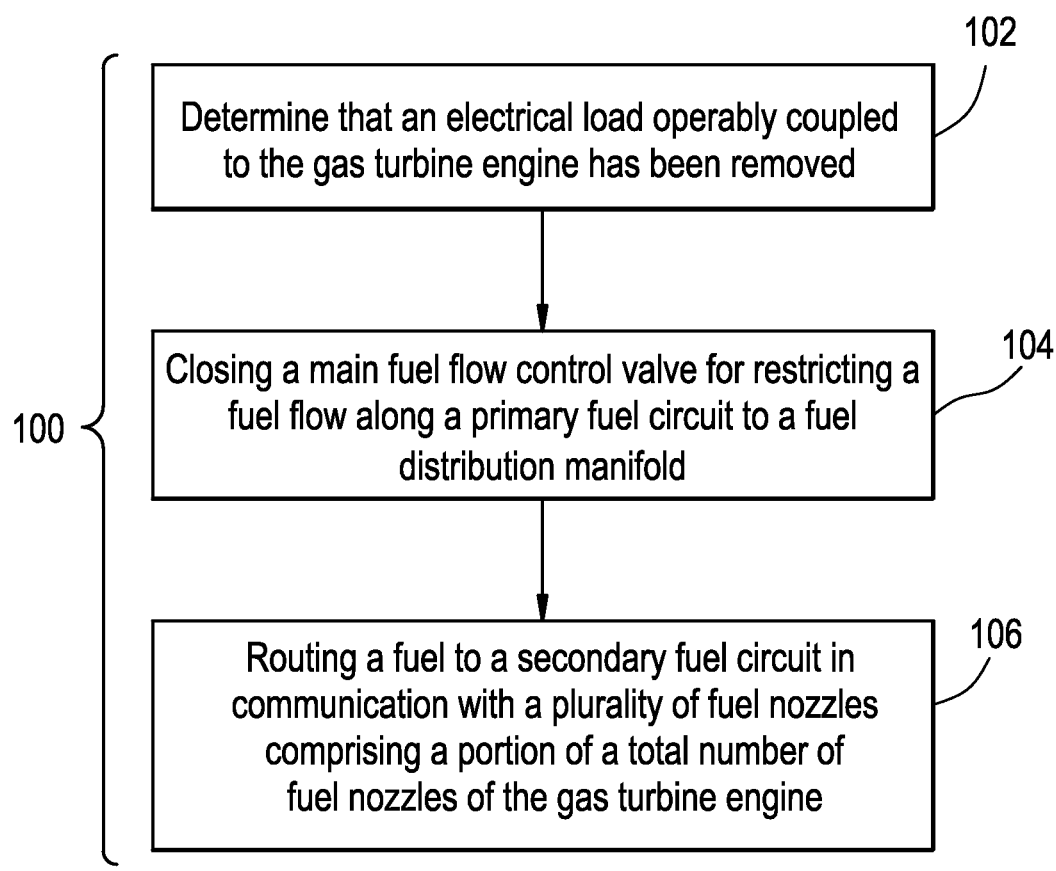

FUEL ROUTING SYSTEM OF A GAS TURBINE ENGINE AND METHOD OF ROUTING FUEL

BACKGROUND OF THE INVENTION

The subject matter disclosed herein relates to gas turbine engines, and more particularly to a fuel routing system of such gas turbine engines, as well as a method of routing fuel therein.

Gas turbine engines are often connected to an electrical load, such as a generator for supplying electrical power. Significant generator speed overshoot may occur if the electrical load is instantaneously removed, thereby causing a transient condition. The transient condition may take place when either a utility breaker to an external grid or the generator breaker trips to an open state. Generator speed overshoot may cause damage to associated equipment as a result of over-frequency of the generator. Additionally, if the generator speed overshoot is above a predetermined threshold, control of the gas turbine engine will command an emergency shutdown and force an operator to conduct a time consuming and costly gas turbine engine restart cycle. Prior efforts to overcome such issues have included quickly reducing fuel flow in response to recognition of the transient condition, thereby reducing fuel flow to a minimum level needed to sustain combustion in an attempt to reduce generator speed overshoot. Unfortunately, this approach provides little to no margin to generator over-frequency limits as generators become lighter and less expensive.

BRIEF DESCRIPTION OF THE INVENTION

According to one aspect of the invention, a fuel routing system of a gas turbine engine includes a primary fuel circuit feeding a fuel distribution manifold which directs fuel to a combustion chamber. Also included is a secondary fuel circuit extending from the primary fuel circuit to a plurality of fuel nozzles configured to direct fuel to the combustor chamber. Further included is a main fuel flow control valve disposed in the primary fuel circuit for restricting fuel flow to the fuel distribution manifold upon removal of an electrical load operably coupled to the gas turbine engine. Yet further included is a plurality of check valves located between the secondary fuel circuit and the primary fuel circuit for restricting the fuel flow from the secondary fuel circuit to the primary fuel circuit.

According to another aspect of the invention, a method of routing fuel in a gas turbine engine is provided. The method includes determining that an electrical load operably coupled to the gas turbine engine has been removed. Also included is closing a main fuel flow control valve for restricting a fuel flow along a primary fuel circuit to a fuel distribution manifold. Further included is routing a fuel to a secondary fuel circuit in communication with a plurality of fuel nozzles comprising a subset of a total number of fuel nozzles of the gas turbine engine.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 3 is a flow diagram illustrating a method of routing fuel in the gas turbine engine.

The detailed description explains embodiments of the invention, together with advantages and features, by way of example with reference to the drawings.

DETAILED DESCRIPTION OF THE INVENTION

Figure 1:
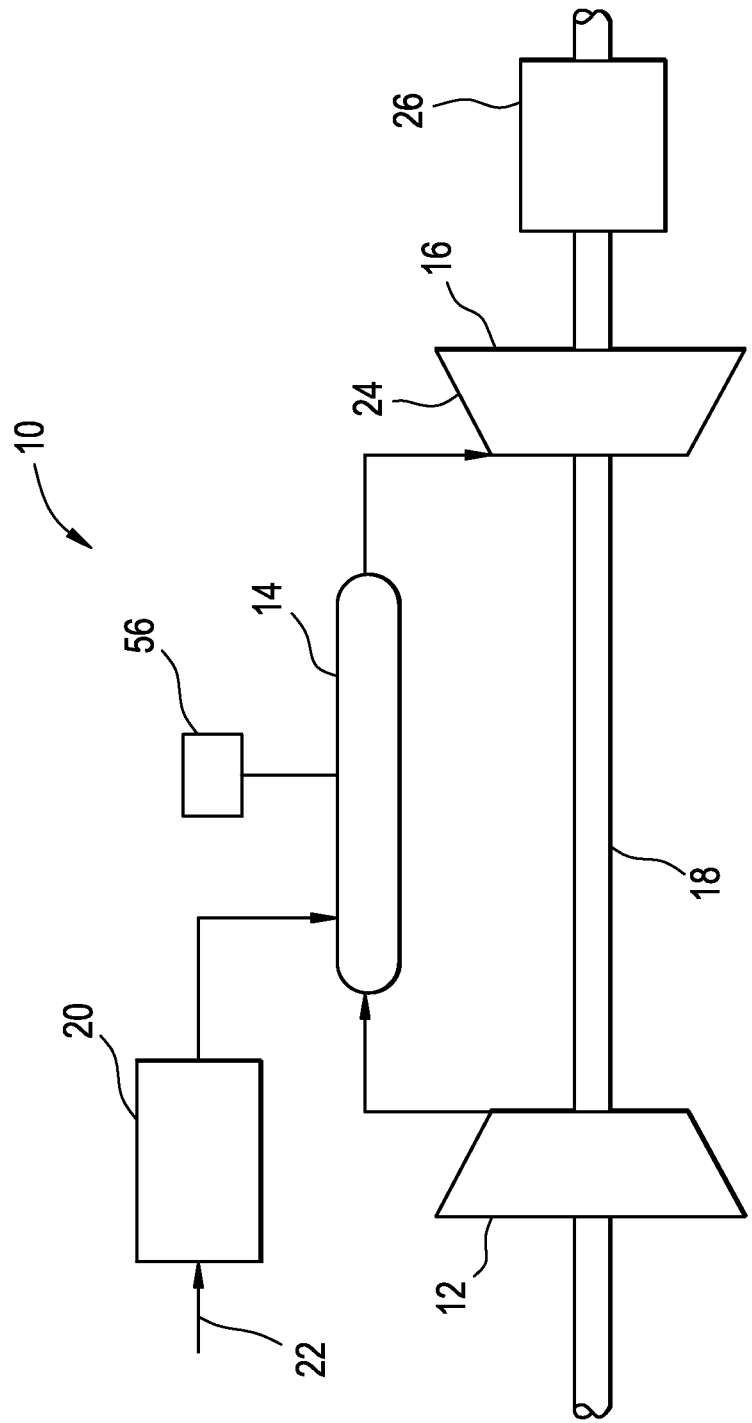
FIG. 1 is a schematic illustration of a gas turbine engine.

Referring to FIG. 1, a turbine system, such as a gas turbine engine, is schematically illustrated with reference numeral 10. The gas turbine engine 10 includes a compressor section 12, a combustor section 14, a turbine section 16, a rotor 18 and a fuel nozzle arrangement 20. It is to be appreciated that one embodiment of the gas turbine engine 10 may include a plurality of compressor sections 12, combustor sections 14, turbine sections 16, rotors 18 and fuel nozzle arrangements 20. The compressor section 12 and the turbine section 16 are coupled by the rotor 18. The rotor 18 may be a single rotor or a plurality of rotor segments coupled together to form the rotor 18.

The combustor section 14 uses a combustible liquid and/or gas fuel, such as natural gas or a synthetic gas, to run the gas turbine engine 10. For example, the fuel nozzle arrangement 20 is in fluid communication with an air supply and a fuel supply 22. The fuel nozzle arrangement 20 creates an air-fuel mixture, and discharges the air-fuel mixture into the combustor section 14, thereby causing a combustion that creates a hot pressurized exhaust gas. The combustor section 14 directs the hot pressurized gas through a transition piece into a turbine nozzle (or "stage one nozzle"), and other stages of buckets and nozzles causing rotation of the turbine section 16 within a turbine casing 24. Rotation of the turbine section 16 causes the rotor 18 to rotate, thereby compressing the air as it flows into the compressor section 12. Additionally, the rotor 18 may be operably coupled to an electrical load 26, such as a generator, configured to convert the mechanical rotational power of the rotor 18 into electrical power.

Figure 2:
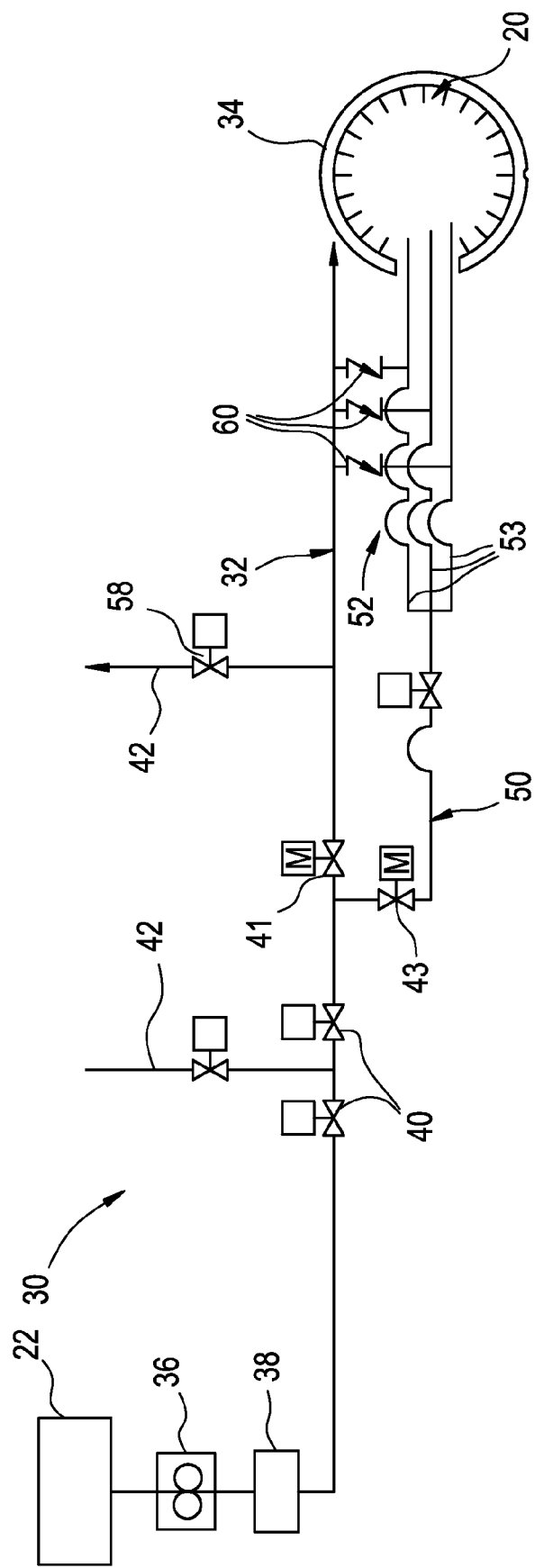
FIG. 2 is a schematic illustration of a fuel routing system of the gas turbine engine.

Referring to FIG. 2, a fuel routing system 30 is schematically illustrated. The fuel routing system 30 includes the fuel supply 22 and the fuel nozzle arrangement 20 described above. A primary fuel circuit 32 is shown and extends from the fuel supply 22 to a fuel distribution manifold 34 configured to deliver fuel to the fuel nozzle arrangement 20. The fuel nozzle arrangement 20 comprises a total number of fuel nozzles that may range depending on the type of the gas turbine engine 10 that the fuel nozzle arrangement 20 is associated with. In one embodiment, the total number of fuel nozzles ranges from about 10 to about 100 fuel nozzles. In another embodiment, the total number of fuel nozzles ranges from about 30 to about 36 fuel nozzles. Irrespective of the precise number of total fuel nozzles, fuel is routed through the primary fuel circuit 32, which may include a number of associated components for routing and treating the fuel during passage to the combustion chamber(s) 14. For example, at least one pump or compressor 36, a heater 38, a main fuel flow control valve 41, and one or more shutoff valves 40 may be included at various positions along the primary fuel circuit 32. Furthermore, at least one vent line 42 may be included to selectively vent contents of the primary fuel circuit 32 to an external location, such as the atmosphere. Additional components may be included and the preceding examples are merely illustrative.

A secondary fuel circuit 50 branches off of the primary fuel circuit 32 and extends between the primary fuel circuit 32 and a plurality of fuel nozzles 52 of the fuel nozzle arrangement 20. The plurality of fuel nozzles 52 comprises merely a subset of the total number of fuel nozzles of the fuel nozzle arrangement 20, with the portion less than the total number of fuel nozzles. In one embodiment, the number of the plurality of fuel nozzles 52 is less than about half of the total number of fuel nozzles. In another embodiment, the number of the plurality of fuel nozzles 52 ranges from about 8 fuel nozzles to about 18 fuel nozzles. In yet another embodiment, the number of the plurality of fuel nozzles 52 ranges from about 8 fuel nozzles to about 10 fuel nozzles. For illustration clarity, only three of the plurality of fuel nozzles 52 are schematically represented, but as is clear from the description above, the number of the plurality of fuel nozzles 52 may be greater or less than the three illustrated. The secondary fuel circuit 50 comprises a plurality of separate fuel lines 53 that each route fuel to a respective fuel nozzle.

Closing the main fuel flow control valve 41 to prevent fuel flow is required upon removal of the electrical load 26, which leads to an open state. To avoid detrimental system operation that may occur during removal of the electrical load 26, the fuel flow to the combustor section 14 is rapidly reduced. The rapid reduction in fuel flow is accomplished by routing of the fuel from the fuel supply 22 to the plurality of fuel nozzles 52 through a secondary fuel flow control valve 43, which as described above is less than the total number of fuel nozzles of the fuel nozzle arrangement 20. By way of example only, if the total number of fuel nozzles is 30 and the number of the plurality of fuel nozzles is 12, closing of the main fuel flow control valve 41 and routing of the fuel through the secondary fuel flow control valve 43 to fuel circuit 50 to only the plurality of fuel nozzles 52 results in a fuel flow of 40% of the fuel that would otherwise be supplied to the total number of fuel nozzles. Accordingly, staging the fuel to a fewer number of fuel nozzles of the combustor section 14 significantly reduces the total burned flow while enabling each fuel nozzle to operate above a flameout threshold, while also reducing the speed overshoot of the electrical load 26.

In one embodiment, the plurality of fuel nozzles 52 are positioned proximate to at least one flame detector 56 (FIG. 1) associated with the combustor section 14. The at least one flame detector 56 is configured to detect burning from at least one fuel nozzle. The failure to detect burning by the at least one flame detector 56 typically results in an automatic shutdown of the gas turbine engine 10. To avoid a full shutdown, and thereby a full startup sequence, the plurality of fuel nozzles 52 are located such that the at least one flame detector 56 detects burning within at least one segment of the combustor section 14.

During operation of the fuel routing system 30 with the main fuel flow control valve 41 in the closed position, a blowoff valve 58 disposed within the at least one vent line 42 is opened to vent contents of the primary fuel circuit 32 to the atmosphere. Specifically, the at least one vent line 42 is disposed between the main fuel flow control valve 41 and the fuel distribution manifold 34. To further prevent unwanted fuel from being situated within the primary fuel circuit 32 downstream of the main fuel flow control valve 41, a plurality of check valves 60 are located between the plurality of fuel nozzles 52 and the primary fuel circuit 32 and remain closed during closed-operation of the secondary fuel flow control valve 43.

As illustrated in the flow diagram of FIG. 3, and with reference to FIGS. 1 and 2, a method of routing fuel in a gas turbine engine 100 is also provided. The gas turbine engine 10 and more specifically the fuel routing system 30 have been previously described and specific structural components need not be described in further detail. The method of routing fuel in a gas turbine engine 100 includes determining that an electrical load operably coupled to the gas turbine engine has been removed 102. A main fuel flow control valve 41 is closed for restricting a fuel flow along a primary fuel circuit to a fuel distribution manifold 104. The fuel is routed to a secondary fuel circuit in communication with a plurality of fuel nozzles comprising a portion of a total number of fuel nozzles of the gas turbine engine 106. The fuel in the main fuel supply circuit 32 is vented to the atmosphere by opening the blowoff valve 58.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel routing system of a gas turbine engine comprising:
   a primary fuel circuit feeding a fuel distribution manifold which directs fuel to a combustor chamber;
   a secondary fuel circuit extending from an upstream location of the primary fuel circuit to a plurality of fuel nozzles configured to direct fuel to the combustor chamber, the secondary fuel circuit including a single fuel line that branches into a plurality of fuel lines that feed the plurality of fuel nozzles;
   a main fuel flow control valve disposed in the primary fuel circuit, the main fuel flow control valve restricting a fuel flow to the fuel distribution manifold upon removal of an electrical load operably coupled to the gas turbine engine; and
   a plurality of check valves located between the secondary fuel circuit and the primary fuel circuit for restricting the fuel flow from the secondary fuel circuit to the primary fuel circuit, the plurality of check valves being located on a plurality of fuel passages directly connecting a downstream location of the primary fuel circuit to the plurality of fuel lines.

2. The fuel routing system of claim 1, wherein each one of the plurality of fuel lines is in communication with one of the plurality of fuel nozzles.

3. The fuel routing system of claim 1, wherein the plurality of fuel nozzles comprises a portion of a total number of fuel nozzles of the gas turbine engine.

4. The fuel routing system of claim 3, wherein the portion of the total number of fuel nozzles is a subset of the total number of fuel nozzles.

5. The fuel routing system of claim 3, wherein the total number of fuel nozzles comprises about 10 fuel nozzles to about 100 fuel nozzles.

6. The fuel routing system of claim 1, further comprising a vent line extending from the primary fuel circuit and extending to a location configured to vent contents of the primary fuel circuit to the atmosphere.

7. The fuel routing system of claim 6, further comprising a blowoff valve disposed in the vent line, the blowoff valve in an open state during a closed condition of the main fuel flow control valve.

8. The fuel routing system of claim 6, wherein the vent line is disposed between the main fuel flow control valve and the fuel distribution manifold.

9. The fuel routing system of claim 1, further comprising at least one flame detector proximate the fuel distribution manifold for detecting burning from at least one fuel nozzle.

10. The fuel routing system of claim 9, wherein the plurality of fuel nozzles in communication with the secondary fuel circuit are disposed proximate the at least one flame detector.

11. The fuel routing system of claim 1, wherein the plurality of fuel nozzles comprises about 8 fuel nozzles to about 18 fuel nozzles.

12. A method of routing fuel within the fuel routing system of claim 1 in a gas turbine engine comprising:
determining that the electrical load operably coupled to the gas turbine engine has been removed;
closing the main fuel flow control valve; and
routing a fuel to the secondary fuel circuit.

13. The method of claim 12, wherein the plurality of fuel nozzles comprises a subset of the total number of fuel nozzles to achieve a reduced overall effective area for fuel injection.

14. The method of claim 12, further comprising restricting the fuel flow between the primary fuel circuit and the plurality of fuel lines of the secondary fuel circuit by closing the plurality of check valves disposed between each of the plurality of fuel lines and the primary fuel circuit.

15. The method of claim 12, further comprising opening a blowoff valve disposed in a vent line during a closed condition of the main fuel flow control valve.

16. The method of claim 12, further comprising selecting which of the total number of fuel nozzles comprise the plurality of fuel nozzles.

17. The method of claim 16, wherein the plurality of fuel nozzles is in close proximity to at least one flame detector proximate the fuel distribution manifold.

* * * * *